L. F. Grant.
Making Tools.
Nº 56,495.   Patented Jul. 17, 1866.
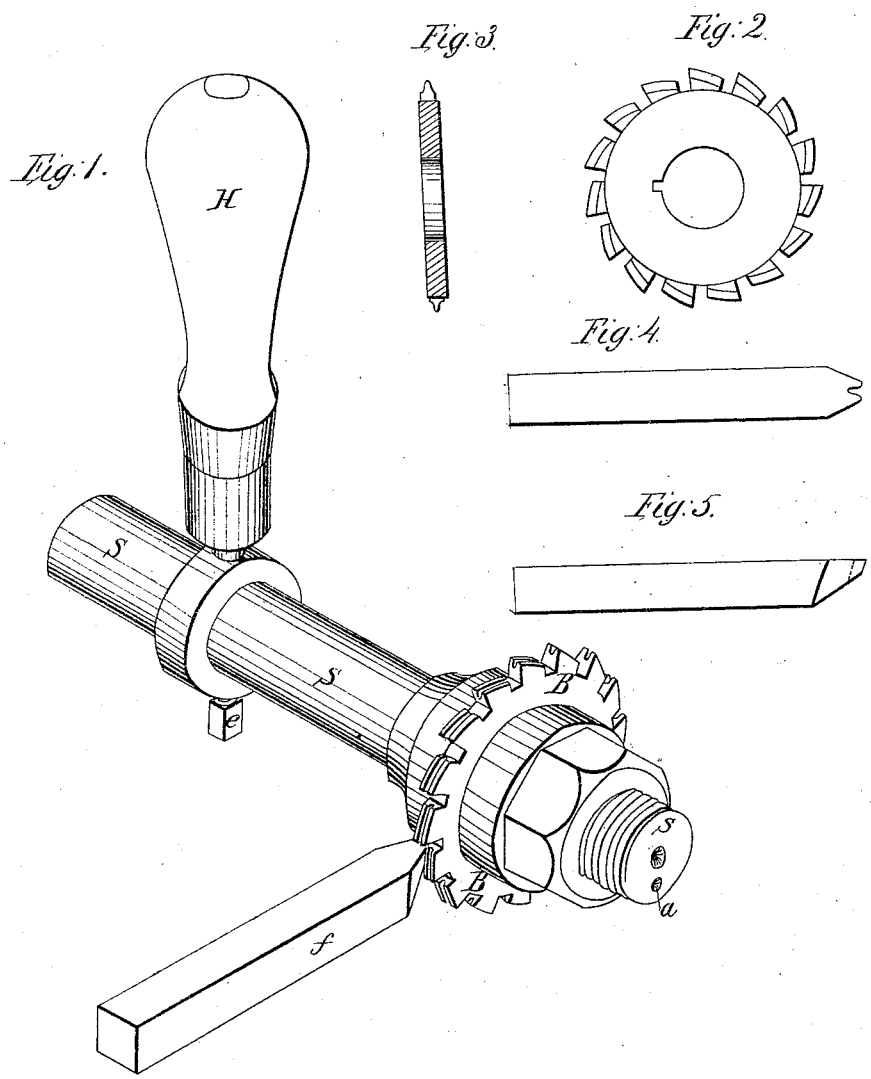
Witnesses;
Jonathan M Peck
John H Duxbury
Inventor;
Lewis F. Grant

UNITED STATES PATENT OFFICE.

LEWIS F. GRANT, OF THOMASTON, CONNECTICUT, ASSIGNOR TO HIMSELF, JOSEPH R. BROWN, AND LUCIEN SHARPE, BOTH OF PROVIDENCE, RHODE ISLAND.

IMPROVEMENT IN MAKING GEAR-CUTTERS.

Specification forming part of Letters Patent No. 56,495, dated July 17, 1866.

*To all whom it may concern:*

Be it known that I, LEWIS F. GRANT, of Thomaston, in the county of Litchfield, and State of Connecticut, have invented certain Improvements in Making the Cutters for Cutting Gears; and I do hereby declare that the following is a full and exact description of the same, reference being had to the accompanying drawings, making part of this specification, in which—

Figure 1 is a perspective view of the apparatus used to form the blades of the double-blade cutter. Fig. 2 is a view of the single-blade cutter hereinafter mentioned. Fig. 3 is a transverse section of the single-blade cutter. Fig. 4 is a plan of the double tool which forms the single and double blades of the cutters. Fig. 5 is a plan of the single tool for working between the double blades of the cutter.

Similar letters refer to like parts in all the figures.

In Letters Patent of the United States No. 45,294, granted to Joseph R. Brown and Lucien Sharpe, under date of November 29, A. D. 1864, is described and claimed an improved cutter for cutting gear-wheels, in which the teeth of the cutter consist of curvilinear ...ions that are mechanically accurate in outline, and of equal size throughout their entire length, and with a sufficient circumferential inclination to produce the requisite clearance, so that the teeth may be sharpened by grinding away the cutting-face, and always present the same cutting contour or edge.

The invention in this case relates to a certain mode of forming the said curvilinear sections or teeth, both for single and double bladed cutters, and is calculated to facilitate the operation of making the class of cutters of the description mentioned, which are intended for cutting fine gearing, such, for instance, as is used in clock and watch work.

My invention consists in mounting the metal disk which is to be formed into a cutter upon a rocking mandrel formed with centers at each end that are sufficiently set aside from the axis of the mandrel to produce the required circumferential inclination to give the proper clearance to the tooth or blade, and by means of a single or double cutting tool or clearer of the proper form of outline to shape the tooth, working the sections or segmental blades of the cutter into the required form, in doing which each blade or segment is placed successively in the same position on the mandrel to be properly formed.

In the said drawings, B, Fig. 1, is the double-bladed cutter on the mandrel S, which is intended to be suspended on the centers of an ordinary engine-lathe at the points $a$ on one side of the axis of the mandrel. H is a handle secured upon the mandrel by means of the set-screw $e$, with which the mandrel is made to vibrate upon the centers to the extent of the length of one of the blades, while the tool $f$ is presented to the cutter-disk in the position shown and fed up to the disk before each cut is made, whereby the blades are worked into proper shape, according to the shape of the tool.

The double-blade cutter, Fig. 1, it will be understood, forms by each cut a complete tooth by removing the metal on each side thereof, and the single-blade cutter, Fig. 2, forms by each cut a complete space by removing the metal from between two adjoining teeth; and these two cutters are formed by first making the single-point tool, Fig. 5, by filing or otherwise working it into the shape of the proposed tooth. The double-point or straddle tool, Fig. 4, is then made by planing a groove with the single tool in a suitable piece of steel, so as to produce the counterpart of the size and shape of the single tool. With this straddle-tool the blades of the single cutter, Fig. 2, are worked into shape by making repeated cuts thereon when mounted on the centers and operating in the manner above described. With the single-point tool the space between and the edges of the blades of the double cutter are wrought into form by making repeated cuts in the same manner.

By means of the single-point and straddle tools, also, a plain straight blade may be produced at a tangent with the circumference of the cutter by holding the cutter-disk in a suitable manner and planing out the blades in due form with the said tools, which mode of forming the said blades is herein contemplated and claimed.

By this method of working the cutter-blades into the required form every possible shape of tooth and space may be made, it being only necessary to give the single-point tool the shape which is desired to be reproduced in the tooth and space of the gear-wheel; and besides this it will be observed that the operation of forming the blades of the cutters is greatly simplified from the ordinary method practiced, or of the mode described for forming the blades in the Letters Patent above referred to, while the same accuracy and perfection are still observed.

Having described my invention, what I claim, and desire to secure by Letters Patent, is—

Forming the blades of cutters for gear-cutting with the tools and in the manner substantially as described.

In testimony whereof I have hereunto set my hand this 30th day of January, A. D. 1866.

LEWIS F. GRANT.

In presence of—
JONATHAN M. PECK,
JOHN H. DUXBURY.